United States Patent [19]

Andoh

[11] Patent Number: 4,691,519
[45] Date of Patent: Sep. 8, 1987

[54] MASTER CYLINDER

[75] Inventor: Munesato Andoh, Higashimatsuyama, Japan

[73] Assignee: Jidosha Kiki Co., Ltd., Japan

[21] Appl. No.: 779,889

[22] Filed: Sep. 25, 1985

[30] Foreign Application Priority Data

Oct. 9, 1984 [JP] Japan ............................ 59-152839[U]

[51] Int. Cl.⁴ .............................................. F15B 7/00
[52] U.S. Cl. ........................................ 60/535; 60/545
[58] Field of Search ......................... 60/534, 535, 545

[56] References Cited

U.S. PATENT DOCUMENTS

| 2,811,600 | 10/1957 | Storck et al. | 60/535 |
| 3,792,433 | 2/1974 | Wada | 60/534 |
| 3,969,898 | 7/1976 | Fulmer et al. | 60/534 |
| 4,385,495 | 5/1983 | Kubota | 60/535 |
| 4,487,021 | 12/1984 | Arakawa et al. | 60/534 |
| 4,615,175 | 10/1986 | Ishiwata et al. | 60/535 |

Primary Examiner—Carroll B. Dority, Jr.
Attorney, Agent, or Firm—McGlew and Tuttle

[57] ABSTRACT

A master cylinder assembly of the type that a current quantity of operating fluid in the interior of a reservoir is detected by function of a float means, wherein the float means has an extension extending with its center of buoyancy disposed near the center line of the reservoir.

2 Claims, 9 Drawing Figures

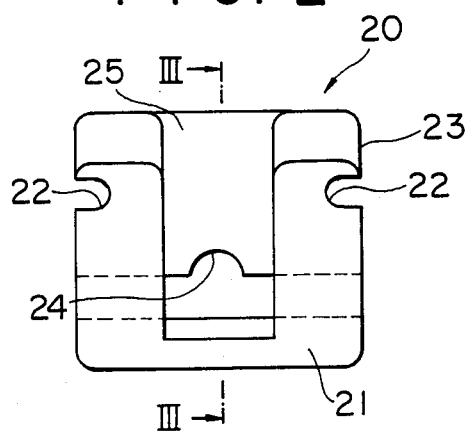
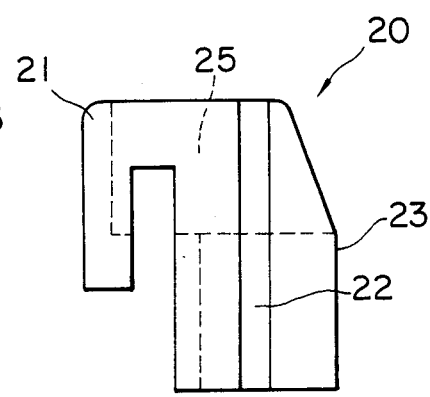
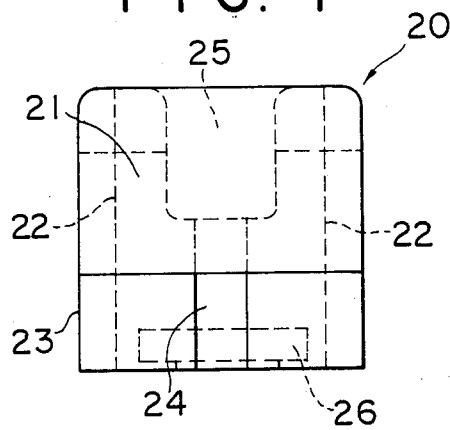
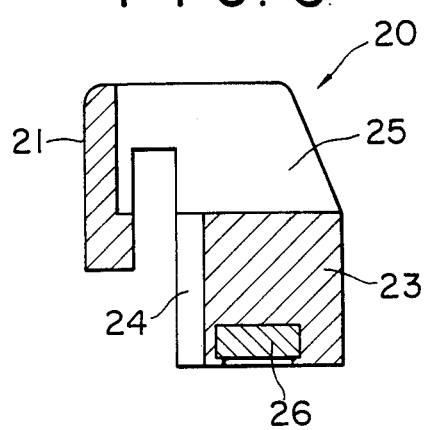
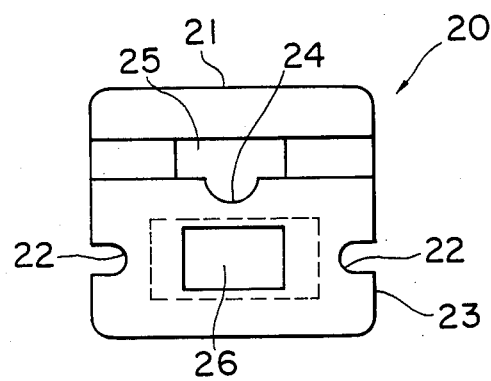

MASTER CYLINDER

BACKGROUND OF THE INVENTION (i) Field of the Invention

The present invention relates to an improvement in or relating to a hydaraulic master cylinder, and more particularly to an improved brake master cylinder for use in the hydraulic brake system for a vehicle which is specifically designed to detect a current volume of operating fluid accumulated in the reservoir by way of a float element.

(ii) Description of the Prior Art

It is generally known that the master cylinder in the hydraulic brake system of an automotive vehicle is constructed to detect a volutme of operating fluid in the fluid reservoir by using a float mechanism incorporated therein. More specifically, according to a typical construction of the conventional hydraulic brake system for use in an automotive vehicle, it is constructed as shown in FIG. 9 that as the level of operating fluid 2 in the interior of a fluid reservoir 1 comes to be lower, a float 3 is adapted to follow downwardly to cause a switch 5 disposed at the bottom of the reservoir 1 to be turned on by using a magnet 4 mounted on the lower part of the float to have a warning lamp in the indicator of the vehicle not shown, for example, turned on so that a driver of the vehicle may be informed of the fact that the current quantity of the operating fluid 22 remaining in the fluid reservoir 1 is decreasing.

In this typical construction, it is seen that the fluid reservoir 1 is mounted through a mounting boss 6 onto a brake master cylinder body 7 in which there are incorporated many working pistons.

Further to the construction of the fluid reservoir assembly mounted upon the master cylinder in which the switch 5 is juxtaposed with respect to the mount boss 6 at the bottom of the fluid reservoir 1, it is generally constructed that a float element 3 disposed in a cooperative relationship with the location of the switch 5 is obliged to be positioned with its center line I offset rearwardly, or towards the direction of reverse operation of the vehicle on which the master cylinder is mounted, from the center line II of the fluid reservoir 1 by a distance l.

Since the master cylinder body 7 in the hydraulic brake system of a vehicle is generally known to those skilled in the art in connection with its construction and operation, any further description will then be omitted herein.

In the construction shown in FIG. 9, there are shown provided a cap for the fluid reservoir 1 designated at the reference numeral 8, passages for directing the operating fluid into the interior of the master cylinder body 7 designated at 9 and 10, and an operating rod at 11, respectively.

According to such a typical construction of the conventional master cylinder in the hydraulic brake system, when the vehicle having such a master cylinder reservoir construction is braked sharply in an emergency, it is observable that the operating fluid 2 in the inside of the fluid reservoir 1 would move forwardly or toward the direction of forward operation of the vehicle with the inertial force rendered therein, thus making the level of the fluid 2 turn from its initial horizontal plane 2a to an inclined plane 2b as shown schematically by dot lines in FIG. 9. Under such a condition, because of the general disposition of the float element 3 being offset rearwardly in the inside of the fluid reservoir 1, a current level of the operating fluid at the center line I of the float element 3 would then turn to be lower than the actual level thereof, accordingly. At this moment, the float element 3 will come lower to turn the switch 5 on, so that there will be produced an erroneous warning of shortage of fluid regardless of its actual due quantity, thus making the driver of the vehicle embarrassed uselessly.

In consideration of such a drawback particular to the conventional construction of a master cylinder reservoir in the hydraulic brake system of an automobile vehicle, it would be desirable to attain an efficient resolution therefor.

The present invention is essentially directed to the provision of a due and proper resolution to such a difficulty in practice as outlined above which has been left unattended with any proper countermeasures therefor.

SUMMARY OF THE INVENTION

It is therefore an object of the present invention to provide an improved master cylinder and reservoir construction in the hydraulic brake system for use in an automotive vehicle, which can effectively overcome such problem in the conventional design and construction and which can afford a reliable operation in the detection of a due level of the operating fluid in the reservoir of the master cylinder.

The above object of the invention can be attained efficiently from an improved disposition in that there is extended a part of a floating element forwardly or towards the direction of forward operation of a vehicle. With this improvement in the location of the float element in the fluid reservoir, it can work effectively preventing the float element from moving improperly dowardly at the moment that the operating fluid level may turn to be inclined by the fluid's inertial force because of the vehicle's sharp braking operation.

Additional features and advantages of the invention will now become more apparent to those skilled in the art upon consideration of the following detailed description of a preferred embodiment exemplifying best mode of carrying out the invention as presently perceived. The detailed description refers particularly to the accompanying drawings, in which like parts are designated at like reference numerals.

BRIEF DESCRIPTION OF THE DRAWING

In the drawings;

FIGS. 2 through 6 are schematic views showing an improved float element by way of a preferred embodiment of the invention; among which FIG. 2 is a top plan view of a float element, FIG. 3 is a side elevational view of the same float element, FIG. 4 is a rear elevational view of the same, FIG. 5 is a cross-sectionala view taken along the line III—III in FIG. 2, and FIG. 6 is a bottom end view of the same;

FIGS. 7 and 8 are schematic views showing an improved serservoir construction according to the invention; among which FIG. 7 is a longitudinal cross-sectional view of the same reservoir and FIG. 8 is a transversal cross-sectional view taken along the line IV—IV in FIG. 7.

DETAILED DESCRIPTION OF A PREFERRED EMBODIMENT

The present invention will now be explained in concrete terms by way of a preferred embodiment thereof in conjunction with the accompanying drawings.

Figure 1:
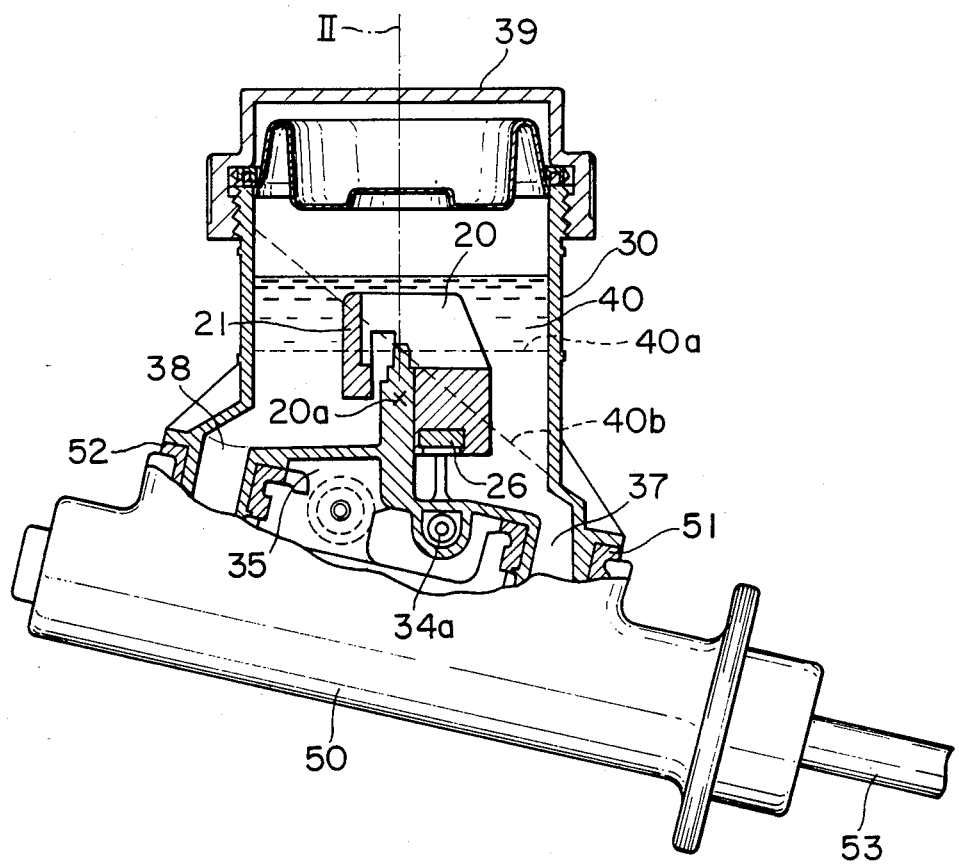
FIG. 1 is a general longitudinal cross-sectional view showing a master cylinder assembly by way of a preferred embodiment of the present invention.

Referring firstly to FIG. 1, there is shown generally in longitudinal cross section the general construction of an improved master cylinder assembly for use in a hydraulic brake system of an automotive vehicle according to the invention.

According to this improvement, as shown in detail by way of FIGS. 1 through 6, there is provided a master cylinder construction such that the upper part of a float element 20 extends forwardly with the formation of an L-shaped extension 21. More specifically, there are shown provided an opposed pair of grooves or cut-outs 22, 22 on the both sides of the float element 20, and another groove or cut-out 24 in the center of the rear side of a float complete 23. There is also shown a large-sized recess or cut-out 25 in the rear central position of the float element 20, extending in continuation from the groove 24 and opening upwardly. With this configuration, it is specifically designed to provide the float element 20 with a center of buoyancy 20a that is located in a relatively low position. There is also seen provided a magnet 26 embedded in the lower part of the float element 20 as shown in FIG. 5.

Figure 7:
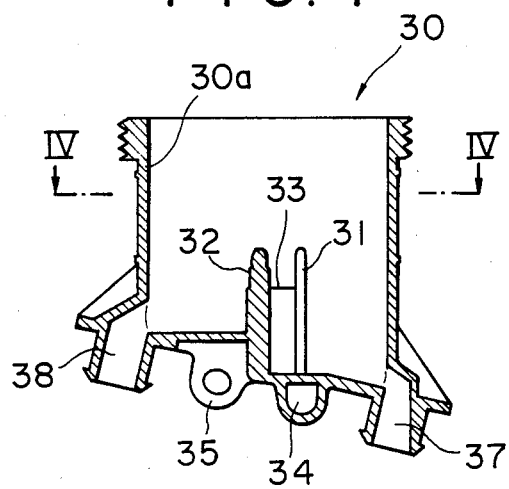
Figure 8:
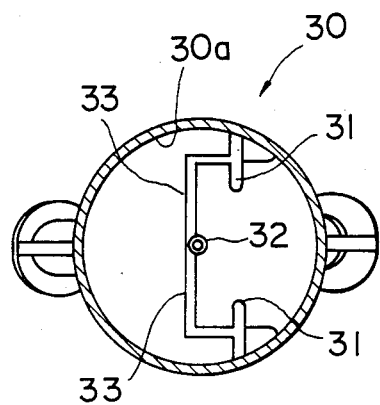
Figure 9:
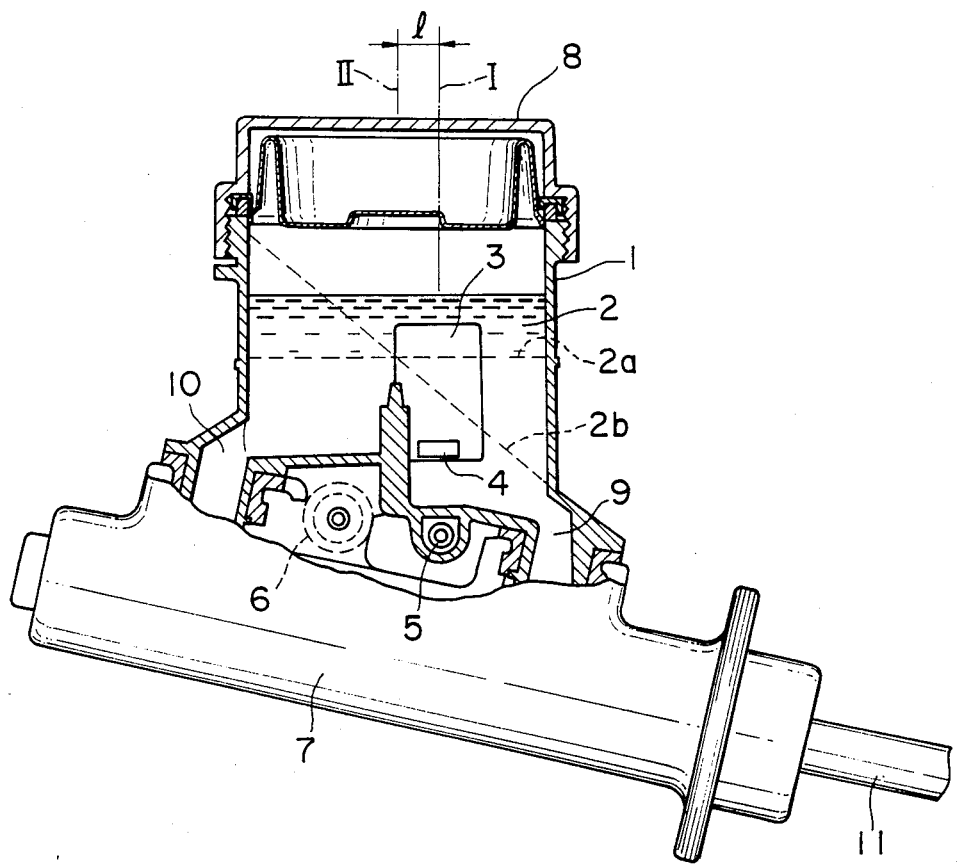
FIG. 9 is a side elevational view showing, partly in section, the main parts of the conventional master cylinder assembly.

It is also shown in further detail in FIGS. 7 and 8 that a reservoir assembly designated at 30 is provided with an opposed pair of ledges 31 projecting inwardly from the inner circumferential wall thereof, and a pair of partition walls 33, 33 extending in continuation across from the paired ledges 31, 31.

At the bottom of the reservoir assembly 30, there is provided a switch box 34 near in the center of a line connecting the paired ledges 31, 31 in such a manner that a mounting boss 35 for the reservoir assembly 30 may be located in the rear of the paired ledges 31, 31, and also there is disposed a switch 34a in the inside of the switch box 34. In addition, there are seen provided passages 37, 38 in a diametrally opposed relationship of the fluid reservoir assembly 30, which are adapted to supply the operating fluid 40 from the inside of the fluid reservoir.

By the way, as it is generally known to those skilled in the art that a master cylinder body 50 is of such construction that comprises a plurality of hydraulic pistons incorporated operatively therein, a further detailed description may be omitted for the purpose of clarity. More specifically, there are shown in FIG. 1 a cap for the reservoir assembly 30 designated at the reference numeral 39, a seal members at 51, 52, and a working rod at 53, respectively.

The reservoir assembly 30 according to the present invention is of such a construction that the float element 20 is mounted slidably onto the paired ledges 31, 31 and the rear central ledge 32 having its grooves or cutouts 22, 22 and 24 engaged snugly along with these ledges, respectively so that the float element 20 may move freely up and down. When inserting the float element 20 in operative position, the extension 21 of the float element faces the forward direction of the vehicle in which this improved master cylinder assembly is installed.

Now, the invention will be described concerning the operation by way of the preferred embodiment thereof, in conjunction with its operative construction.

Assuming that a vehicle equipped with the improved master cylinder assembly according to the invention is stopping or running at a constant velocity, it is known that the level of the operating fluid 40 in the inside of the reservoir assembly 30 is in a horizontal plane 40a. Then, supposing that there is contained a sufficient amount of operating fluid 40 in the reservoir and that the vehicle is given a sharp braking, the level of the operating fluid 40 will turn to be inclined from its horizontal plane 40a to an inclined plane 40b under the effect of an inertial force rendered therein. At this moment of sharp braking, a current position taken by the float element 20 is in the center line II of the reservoir assembly 30 where there occurs a least extent of alteration in the level of the operating fluid 40, even if the fluid level is caused to be inclined under the inertial force, which would not deviate substantially from the position where the level of the operating fluid 40 is in the horizontal plane 40a. As a consequence, therefore, it can be appreciated that the position of the float element 20 is not affected by the inclination of the fluid level, accordingly.

Now, when there is left a relatively small quantity of operating fluid 40 in the interior of the reservoir assembly 30, the float element 20 is then caused to be lowered as the lowering of the fluid level, thus causing the switch 34a to be turned on by function of the magnet 26 and thus producing a warning of shortage of the operating fluid in the reservoir assembly 30, which is common with the operation of the conventional master cylinder reservoir system.

What is particularly in contrast to the operation of the conventional master cylinder reservoir system may occur from the improvement as attained by the present invention in the following manner. That is, according to the construction shown by way of the preferred embodiment, it is constructed such that the center of buoyancy 20a of the float element 20 having the L-shape upper extension is specifically disposed in the center line II of the reservoir assembly 30, so that there is attained such an advantageous effect that the position of the float element 20 may not be affected substantially by the changes in the level of the operating fluid 40 in the reservoir assembly 30.

While the foregoing description of the present invention is restricted to the preferred embodiment wherein the center of buoyancy 20a of the float resides in the center line II of the reservoir, this is not an essential requirement but it can be adapted to an equal effect with such a construction that the extension of the float element 20 may be designed to be greater or even in a different shape. More specifically, the only requirement particular to the invention is that the float element 20 is of such a configuration that it may be held stably from moving or playing downwardly to a substantial extent in the interior of the reservoir assembly 30, when the level of the operating fluid may turn to be inclined from its inertial effect.

Incidentally, while there is employed in the preferred embodiment the switching function of the type that the switch 34a is operated with the aid of the magnet 26 provided in the lower part of the float element 20, the present invention is not restricted in practice to such details of this embodiment, but it is of course possible in practice to adopt any other types of means for the detection of the current position of the float element which is of the type that is adapted to detect the current quantity of operating fluid remaining in the reservoir assembly by using a float element, accordingly.

As reviewed fully hereinbefore, the master cylinder assembly having the substantial improvement in construction according to the present invention may present such advantageous effect and function as follows.

By virtue of the employment of the extension in irregular configuration of the float element disposed toward the direction of forward opeartion of a vehicle in the interior of the reservoir assembly, the float element is efficiently prevented from an improper downward motion or play, when the level of the operating fluid in the inside of the reservoir may turn to be inclined, thus preventing any improper function of the switch incorporated to produce an erroneous warning of shortage of operating fluid remaining in the reservoir and eliminating a chance to make the driver of a vehicle embarrassed uselessly during the operation, thus contributing substantially to the safety in operation.

While the present invention has been described in detail by way of specific preferred embodiments thereof, it is to be understood that the present invention is not intended to be restricted to the details of the specific constructions shown in the preferred embodiments, but to contrary, the present invention can of course be practiced in many other arrangement to an equal advantageous effect in accordance with the foregoing teachings without any restriction thereto and without departing from the spirit and scope of the invention.

It is also to be understood that the appended claims are intended to cover all of such generic and specific features particular to the invention as disclosed herein and all statements relating to the scope of the invention, which as a matter of language might be said to fall thereunder.

What is claimed is:

1. A cylinder construction for a tandem fluid pressure system, comprising a housing defining a liquid reservoir, a central upstanding partition centered within said reservoir, a float for floating on liquid in said liquid reservoir and having a vertical guideway into which said partition extends providing a guide for said float for guiding said float along its center of buoyancy for upward and downward movement along the center line of said liquid reservoir, a magnet carried by said float, and a magnetically operated switch carried by said housing in a position to be influenced by said magnet when said float is in a predetermined lower position due to the withdrawal of liquid from the reservoir, said float including an upper portion of substantially L-shaped cross section having a face engaging behind one side of said partition and having a front portion engaging on the opposite side of said partition, said magnet being held by the bottom of said float.

2. A cylinder construction according to claim 1 including a tandem master cylinder providing a mounting for said housing, said housing having a fitting engageable on said master cylinder and having a bottom with a flow connecting at each side into the master cylinder, said partition being extending upwardly from said bottom, said switch being carried by said housing adjacent said bottom.

* * * * *